Sept. 29, 1959 W. VAHS 2,906,291
VALVE CONTROL MEANS FOR HYDRAULIC FLUID-OPERATED DEVICES
Filed March 2, 1953 4 Sheets-Sheet 1
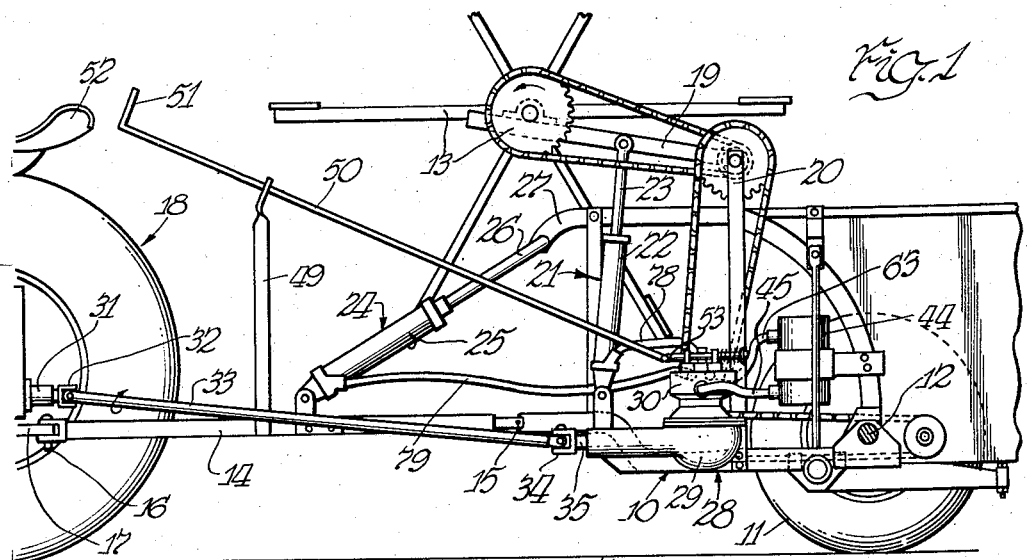
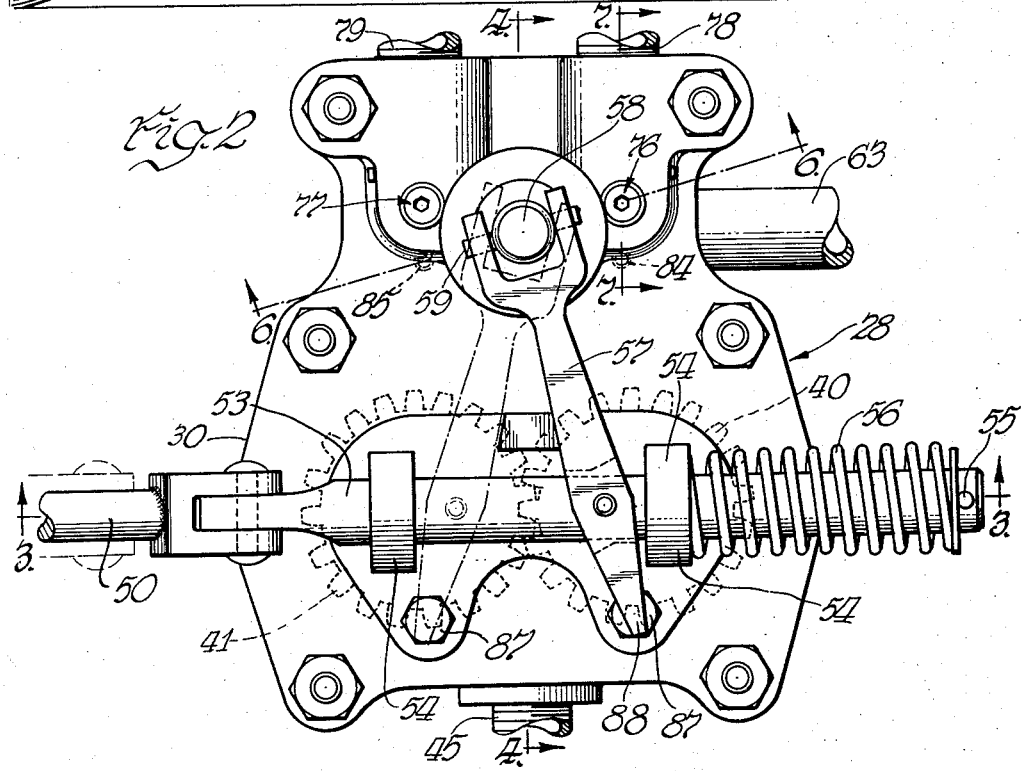
Inventor
William Vahs
Paul O. Pippel
Atty.

Sept. 29, 1959 W. VAHS 2,906,291
VALVE CONTROL MEANS FOR HYDRAULIC FLUID-OPERATED DEVICES
Filed March 2, 1953 4 Sheets-Sheet 2

Inventor
William Vahs
Paul O. Pippel
Atty.

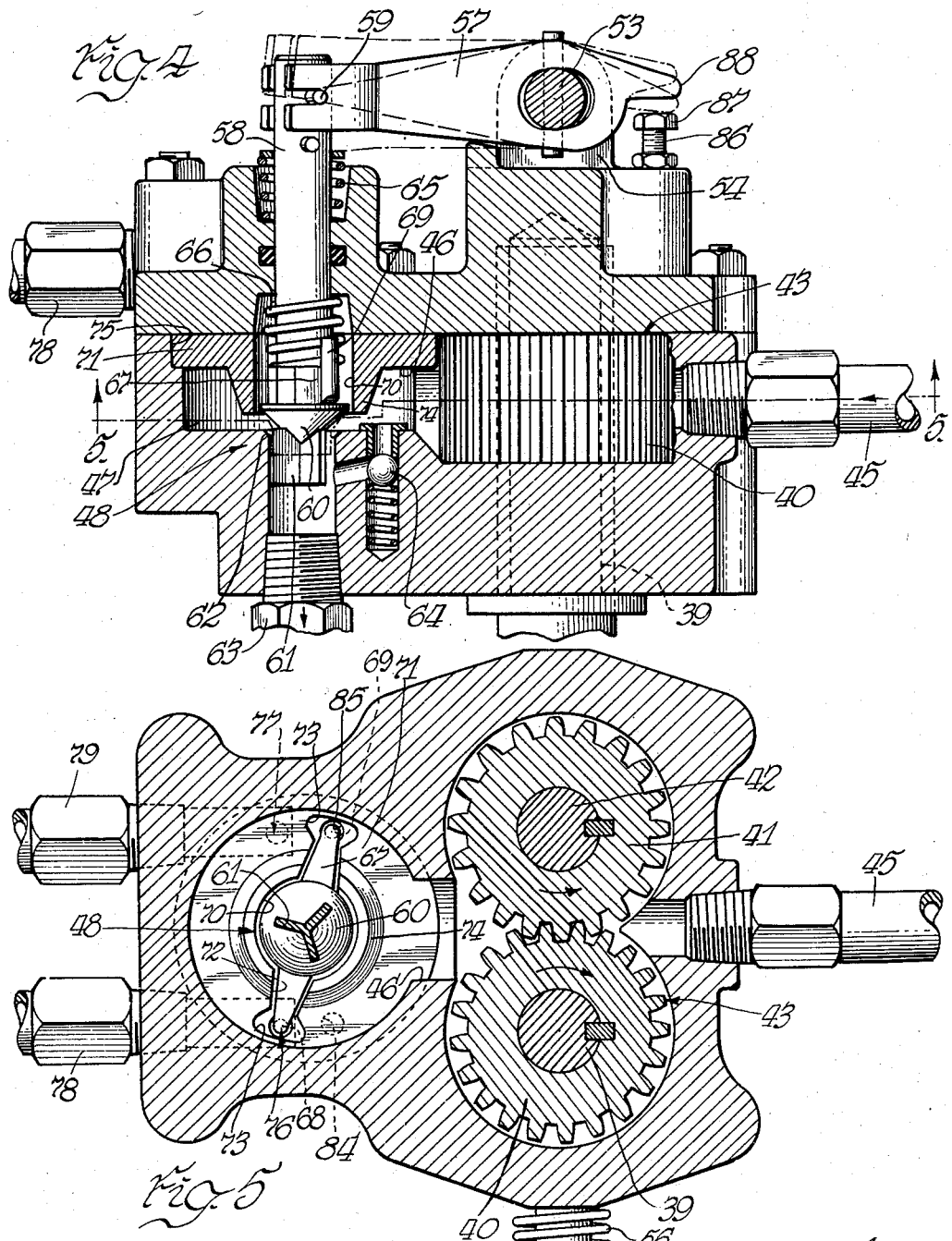

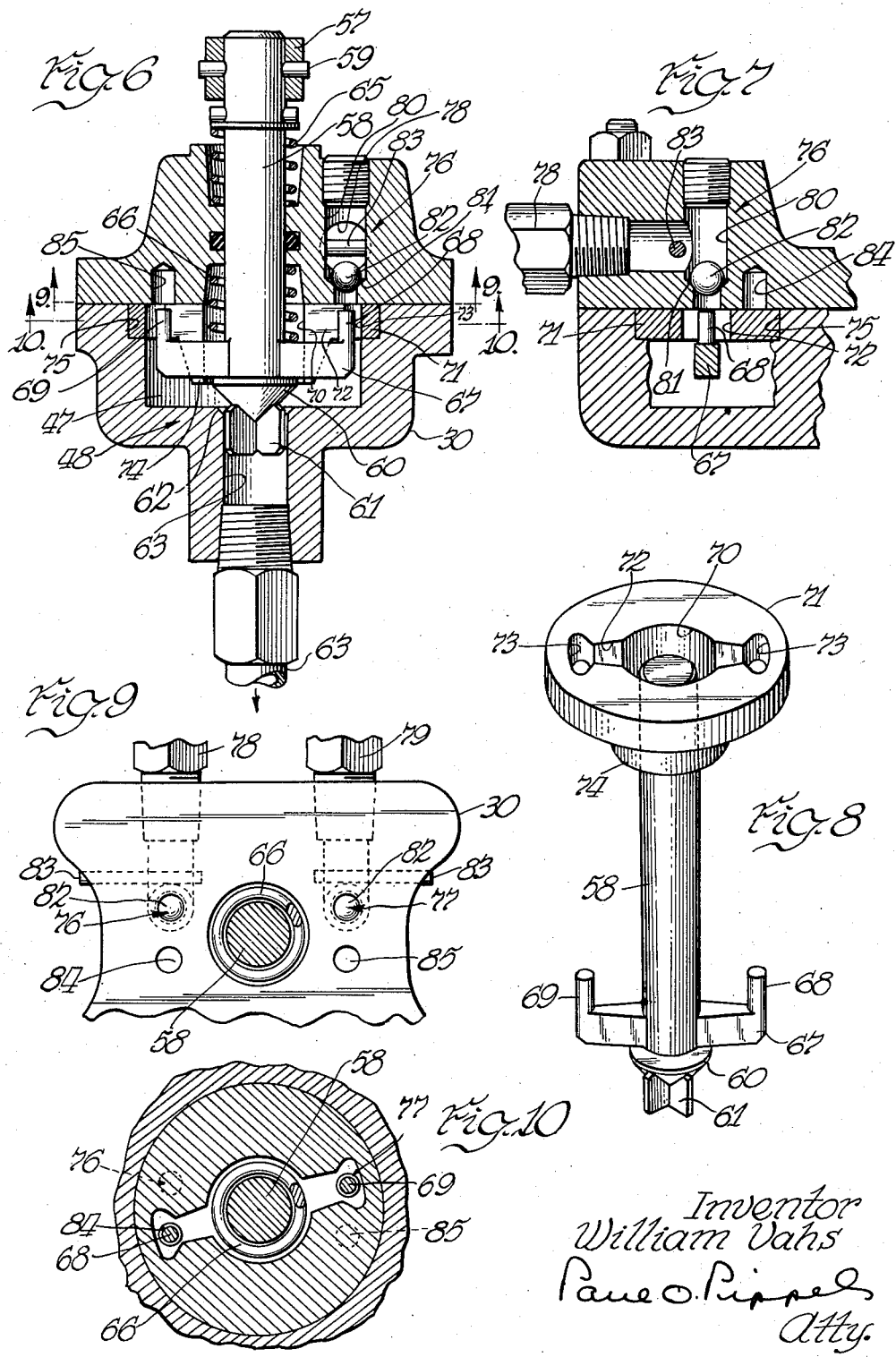

United States Patent Office 2,906,291
Patented Sept. 29, 1959

2,906,291

VALVE CONTROL MEANS FOR HYDRAULIC FLUID-OPERATED DEVICES

William Vahs, Hamilton, Ontario, Canada, assignor to International Harvester Company, a corporation of New Jersey Application March 2, 1953, Serial No. 339,827

11 Claims. (Cl. 137—622)

This invention relates to hydraulic power transmission mechanism and is particularly applicable to valve control means by which fluid from a pressure source is transmitted to one or more fluid operated devices, such as hydraulic rams, for the transmission of power therethrough.

The principal object of the invention is the provision of an improved hydraulic pump and valve mechanism particularly well adapted for use in connection with the operation of agricultural implements and parts thereof.

Another object of the invention is the provision of novel control means for regulating the flow of fluid through valve mechanism to fluid-actuated rams.

Another object of the invention is the provision of novel hydraulic pump and valve mechanism and single control means therefor operable to actuate a plurality of hydraulic rams separately.

A further object of the invention is the provision in control mechanism for a hydraulic valve, of a valve shaft which can be rotated to open one fluid outlet and close another, and can be moved axially to allow fluid to flow to and from a source of supply.

Other objects and advantages of the invention will become clear from the following detailed description when read in conjunction with the accompanying drawings, wherein:

Figure 1 is a view in side elevation and partly in section of an agricultural implement in the form of a windrow harvester drawn by a tractor and having mounted thereon hydraulic power transmitting mechanism incorporating the features of this invention;

Figure 2 is an enlarged plan view of the hydraulic pump and valve assembly shown in Figure 1 and illustrating particularly a portion of the control mechanism therefor;

Figure 4 is a sectional view taken on the line 4—4 of Figure 2;

Figure 5 is a section taken on the line 5—5 of Figure 4;

Figure 6 is a section taken on the line 6—6 of Figure 2, showing the main and auxiliary valve arrangement;

Figure 7 is a section taken on the line 7—7 of Figure 2;

Figure 8 is an enlarged detail of the main valve stem or shaft, showing the auxiliary valve closure plate partly disassembled therefrom;

Figure 9 is a section taken on the line 9—9 of Figure 6; and

Figure 10 is a section taken on the line 10—10 of Figure 6.

Figure 3:
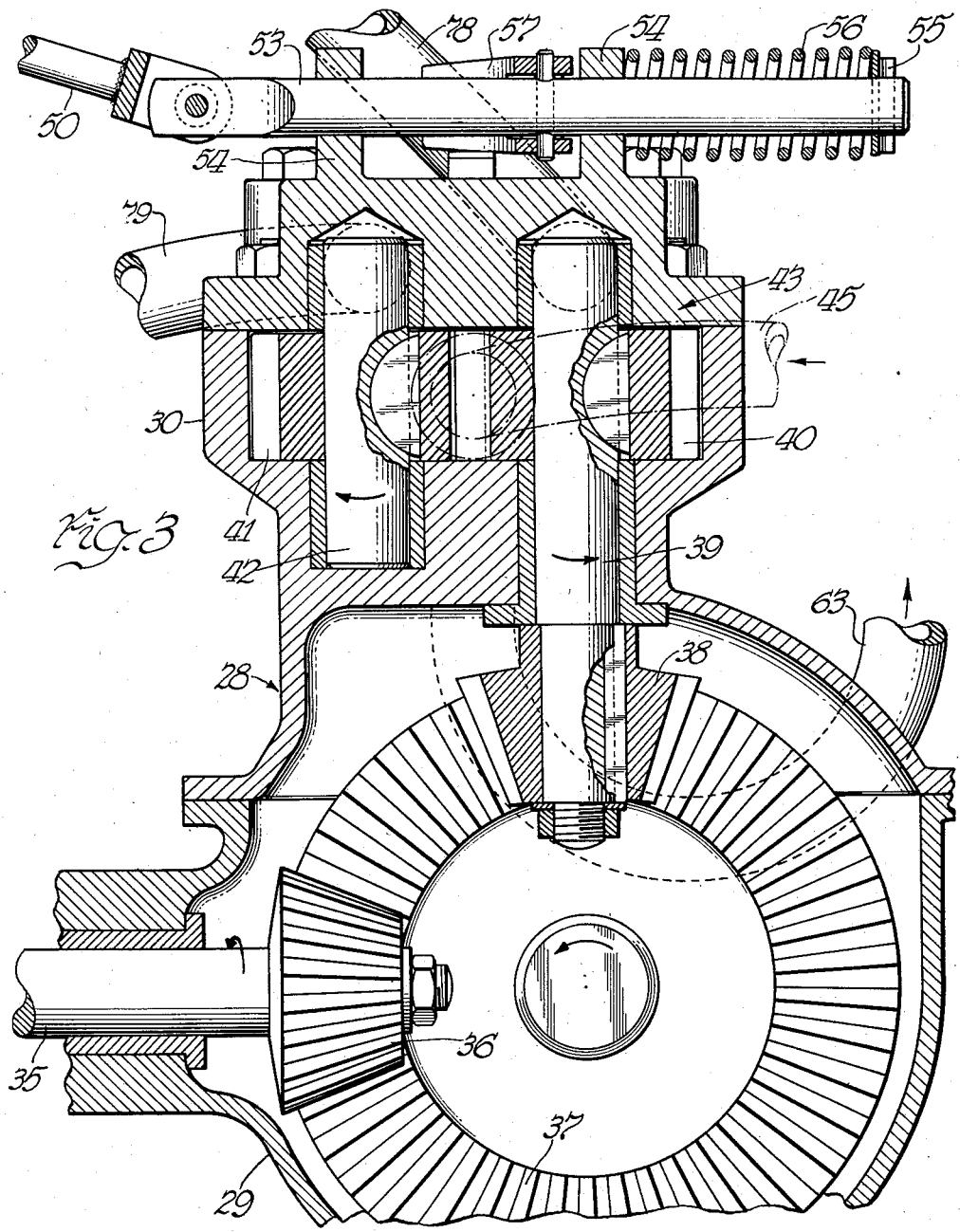
Figure 3 is a sectional view of the pump and valve assembly as well as the drive means therefor, taken on the line 3—3 of Figure 2.

Referring to the drawings, the hydraulic valve and control mechanism of this invention is shown, for purposes of illustration, in its application to a tractor-propelled implement of the windrow harvester type. The implement is illustrated more or less diagrammatically and comprises a platform 10 supported by wheels 11 mounted on a transverse axle 12. Suitable grain cutting mechanism, not shown, cuts the grain, which is gathered and directed to the platform by a reel 13. Conventional conveying mechanism, also not shown, is provided for depositing the cut grain in a windrow.

A hitch frame 14 is pivotally connected at 15 to the platform, and its forward end is connected by a pin 16 to the drawbar 17 of a tractor designated by the numeral 18. The reel 13 is carried on a support 19 pivoted at one end on an upright 20 secured to the implement frame. Vertical adjustment of the reel is achieved by the operation of a ram 21 comprising a cylinder 22 pivotally anchored to the platform of the implement, and a piston rod 23 connected to the reel support 19. Adjustment of the platform is accomplished by operation of a ram 24 comprising a cylinder 25 pivotally mounted on the hitch 14 and a piston rod 26 connected to a frame part 27 mounted upon the implement frame. Operation of the ram 24 buckles the implement platform relative to the hitch at the pivot point 15, thus tilting the platform about the axis of the wheels 11 to effect vertical adjustment thereof and of the cutting mechanism.

The hydraulic pump and valve assembly for operating the rams 21 and 24 is mounted on the platform of the implement and is designated by the numeral 28. This assembly includes a gear housing portion 29 and a pump housing portion 30. The power take-off shaft 31 of the tractor is connected by a universal joint 32 to a telescoping rod 33 which is, in turn, connected by a universal joint 34 to a shaft 35 mounted in an extension of the gear housing 29, and having at its end a pinion 36 engaging a gear 37 rotatably mounted in the housing 29 (see Figure 3). Another gear 38 engaging the gear 37 is mounted on the end of a driven shaft 39 extending upwardly into the housing portion 30. Another gear 40 keyed to shaft 39 meshes with a gear 41 keyed to an idler shaft 42 mounted in the housing portion 30. The shafts upon which the gears 40 and 41 are mounted rotate in the direction of the arrows shown in Figure 3 and constitute a pump designated generally by the numeral 43, adapted to withdraw fluid under pressure from a supply source in the form of a tank 44 mounted on the implement platform.

Fluid is withdrawn from tank 44 through hose line 45 and is directed through an inlet or supply port 46 (see Fig. 4) to the valve chamber 47 of the main valve structure generally designated at 48, from which it is selectively distributed, in a manner hereinafter to become clear, to the ram units 21 and 24.

Secured to the hitch frame 14 is an upright 49 apertured at its upper end to rotatably and slidably receive a control rod 50 having a handle 51 extending to a location accessible to the tractor operator from his station 52. The rear end of rod 50 is pivotally connected to one end of another rod 53 rotatably and slidably received in apertures provided in spaced ears 54 projecting upwardly from and integral with the housing portion 30. The other end of rod 53 is provided with a pin 55 engaging one end of a compression spring 56 surrounding the rod and the other end of which engages the adjacent ear 54.

Between the ears 54 the rod 53 is received in an opening in a lever 57 which is pivotally connected to the rod. The other end of the lever is bifurcated and straddles the upper end of a valve closure member or shaft 58 to which it is pivotally attached by a pin 59. To facilitate assembly the bifurcated end of the lever is slotted to receive the pin.

The valve closure shaft 58 is vertically slidable in an opening provided in the housing 30. The lower end of the shaft 58 has a valve head 60 thereon and guide means 61. The head 60 is engageable with the valve seat 62 and the guide means 61 penetrates the outlet or exhaust port and conduit 63 through which fluid is returned to the tank 44. A bypass valve 64 (see Fig. 4) provides communication between the main valve chamber and the outlet or exhaust port when the main valve is closed and the pressure reaches a certain amount. Springs 65 and 66 surrounding the shaft 58 function to bias the valve shaft to a neutral position such as that shown in Figure 4.

At this point it should be clear that the valve shaft 58 is under the control of the tractor operator from his seat on the tractor. By referring to Figure 2 it will be observed that the lever 57 is normally biased by the spring 56 to the solid line position shown and that the operator by grasping the handle 51 and pulling the rod 50 toward him, will cause the lever 57 to swing to the dotted line position, thus rotating valve shaft 58. It will also be noted that by turning the handle 51 to his left as he faces the implement, the rocking of the lever 57 by the operator will force the shaft 58 down on its seat 62.

As shown in Figures 6 and 8, valve shaft 58 has at its lower end a cross piece 67 extending radially from opposite sides of the shaft and having at its ends upstanding projections or lugs 68 and 69. Likewise mounted on the valve shaft and having a central bore 70 to receive the shaft is a circular disk 71 having a transverse slot 72 communicating with opposed openings 73 and the central bore 70 and extending through the hub portion 74 of the disk. The parts are shown in disassembled position in Figure 8, and in Figure 6 it is made clear that the disk 71 is seated in a recess 75 of the housing portion 30. The disk is rotatable in its seat but cannot be displaced axially.

Also mounted in housing 30 is a pair of auxiliary valves in the form of ball type check valves 76 and 77 connected, respectively, to conduits 78 and 79 leading to the rams 21 and 24, respectively. Each of the valves 76 and 77 comprises a passage or pressure port 80 and a seat 81 for a ball 82 limited in its movement away from the seat by a bar 83.

Likewise provided in the housing portion 30 is a pair of recesses 84 and 85, the relationship of which to the check valves is indicated in Figures 2, 5, 9 and 10, and these recesses function in a manner which will hereinafter become clear.

Fluid withdrawn under pressure from tank 44 through hose line 45 by pump 43 is forced into the valve chamber 47 of the main valve 48 by way of the inlet or supply port 46. The tractor operator grasps the handle 51 and turns it in a direction to rock the lever 57 and force the valve shaft 58 down upon its seat 62. He also moves the rod 50 axially toward or away from him depending upon which of the ram units 21 or 24 is to be actuated. In Figure 5 it will be observed that one of the openings 73 in the disk 71 is in registry with the check valve 76 and that the other check valve 77 is covered by the disk. Since check valve 76 communicates with the pressure port 80 and the ram unit 24, the latter will be actuated to adjust the implement platform. With the valve head 60 engaging the valve seat 62, the valve is closed and fluid entering the port 46 builds pressure in the main valve chamber which unseats the ball 82 of the exposed check valve. Fluid, therefore, passes from the tank under pressure directly to the associated ram unit. The check valve ball is closed by the pressure of fluid in the cylinder which exerts back pressure in pressure port 80 against the ball 82. Selection and operation of the other ram is made by the operator simply moving the rod 50 axially in the opposite direction to turn the rotatable valve disk 71 in the other direction, blocking off the one check valve 76 and causing the other opening 73 in the disk to register with the other check valve 77. Fluid then passes through this check valve to the cylinder 22 for adjusting the reel 13. The valve shaft 58 is biased to a neutral position as shown in Figures 4 and 6 by the springs 65 and 66 permitting fluid to circulate between the valve chamber and the tank.

When one of the cylinders is to be emptied or fluid withdrawn therefrom, the operator turns the handle 51 in a direction to rock the lever 57 and raise the valve shaft 58. As the valve shaft moves upwardly from the valve seat, one of the projections 68 or 69 penetrates the appropriate check valve 76 or 77, unseating the ball 82 and permitting fluid to flow from the associated cylinder back into the valve chamber and through the port 63 to return to the tank 44. To withdraw fluid from the other cylinder the operator simply rotates the disk 71 by turning the lever 51 in the opposite direction to open the appropriate check valve.

In Figure 6 it will be observed that when the projection 68 penetrates the valve 76 to unseat the ball 82, provision is made for the other projection 69 of the auxiliary valve actuator 67, in the form of the recess 85 in the housing 30. It should be clear from Figures 5 and 10 that whenever one of the projections 68 or 69 has penetrated a chosen check valve, the other projection is received in a recess provided therefor. The speed of retraction of the piston rods 23 and 26 of the associated ram units may be adjusted, respectively, by means of a bolt 86 having a head 87 engageable with an extension 88 of the lever 57. This bolt may be screwed into the housing or withdrawn therefrom to vary the throw of the lever 57. By shortening the throw of the lever, for example, the extent of movement of the balls 82 by projections 68 or 69 is lessened, constricting the passage between the ball and its seat 81, thus slowing the passage of fluid therethrough from the associated ram. The opening between valve head 60 and its seat 62 is similarly restricted.

The function of the spring 56 on the shaft 53 is to return the control rod 50 and, therefore, the valve disk 71 to a position most often used for operating the implement adjustable part most often regulated.

The operation of the hydraulic control mechanism of this invention should be clearly understood from the foregoing description. It should also be understood, however, that modifications may be made in the invention without departing from the spirit thereof or the scope of the appended claims.

What is claimed is:

1. Apparatus for regulating the flow of fluid under pressure comprising a housing, a main valve structure having supply and exhaust ports for the reception of fluid from and return of fluid to a supply source, a pair of pressure ports formed in said housing, auxiliary valves providing communication between the main valve structure and the respective of said pressure ports, said auxiliary valves being openable in response to the pressure of fluid entering the main valve structure through the supply port upon closing of the exhaust port, and closable in response to the pressure of fluid in said pressure ports, a valve shaft axially movable to and from a closing position relative to said exhaust port and rotatable about its axis, a movable member mounted in the main valve structure and movable alternately by rotation of said shaft about its axis to positions simultaneously blocking one of said auxiliary valves while exposing the other to accommodate passage of fluid through a selected one of said valves at a time, and common control means operatively connected to said valve shaft and said movable member.

2. The invention set forth in claim 1, wherein said common control means is rotatable about an axis in opposite directions to move said shaft to open and close the exhaust port, and is axially movable in opposite directions to move said movable member to alternately expose a selected one of said auxiliary valves.

3. The invention set forth in claim 1, wherein each of the auxiliary valves is a ball type check valve, and a projection carried by the shaft is insertable in a selected one of said valves to unseat the ball.

4. The invention set forth in claim 3, wherein adjustable means is provided for limiting the extent of movement of said shaft to unseat said ball, whereby to regulate the flow of fluid through said auxiliary valves.

5. Apparatus for regulating the flow of fluid under pressure comprising a housing, a main valve structure in the housing having supply and exhaust ports for the reception of fluid from and return of fluid to a supply source, pressure ports formed in said housing, auxiliary valves in said pressure ports, said auxiliary valves being openable in response to the pressure of fluid entering the main valve structure through the supply port upon closing the exhaust port and closable in response to the pressure of fluid in said pressure ports, a rotatable valve shaft axially movable between open and closed positions relative to said exhaust port, projections carried by said shaft, one of which is registrable with and insertable in a selected one of said auxiliary valves upon movement of the shaft to its open position, and an auxiliary valve closing member mounted on said shaft rotatable therewith and having openings formed therein for the reception of said projections, said auxiliary valve closing member being rotatable with the shaft to a position to block passage of fluid through one of said auxiliary valves and with a selected one of said openings in registry with a selected one of said auxilary valves for the reception of the associated projection upon axial movement of the shaft to its valve-open position.

6. The invention set forth in claim 5, wherein the auxiliary valve closing member is a circular disk mounted for rotation but against axial movement in said housing.

7. The invention set forth in claim 6, wherein the housing is provided with recesses to receive the projections on said shaft not in registry with the selected of said auxiliary valves.

8. A valve mechanism for controlling the flow of fluid under pressure comprising a housing, a valve chamber in the housing having fluid supply and exhaust ports, a pair of pressure ports formed in said housing, a valve shaft rotatably mounted in the housing and axially slidable therein between open and closed positions relative to the fluid exhaust port, a pair of check valves in said housing providing communication between the valve chamber and the pressure ports and openable in response to pressure of fluid in the chamber when the exhaust port is closed and closable by the pressure of fluid in the pressure ports, said valve shaft having one end extending outwardly from the housing, a rotatable manually operable control member having a radial arm thereon connected to the valve shaft for imparting axial sliding movement thereto upon rotation of the control member, said control member being axially movable to transmit rotary motion through said arm to the valve shaft, and a check-valve-blocking device mounted on the valve shaft and movable therewith upon rotation thereof to a position to block passage of fluid through a selected one of said check valves, said valve-blocking device being axially movable with said valve shaft upon axial movement of the latter and having means thereon for opening one of said check valves.

9. The invention set forth in claim 8, wherein a projection mounted on the valve shaft is receivable in and opens a selected one of said check valves upon axial movement of the shaft to open position relative to the exhaust port.

10. The invention set forth in claim 8, wherein the check-valve-blocking device is rotatable with the valve shaft in opposite directions in response to axial movement of the control member in opposite directions, and wherein spring means is provided on the control member for biasing it in one direction.

11. Hydraulic control apparatus comprising a housing, a main valve structure having supply and exhaust ports, valve closure means in the form of a shaft axially movable to and from a closed position relative to the exhaust port, pressure ports formed in said housing, auxiliary valves providing communication between the main valve structure and the respective of said pressure ports and openable in response to the pressure of fluid entering the main valve structure through the supply port and closable in response to the pressure in said pressure ports, a valve control member operatively connected to said valve closure shaft and rockable in one direction about an axis to move said valve closure shaft to its closed position and in the other direction to move it to its open position, and auxiliary valve opening means mounted upon and axially movable with said valve closure shaft to its open position, said auxiliary valve opening means being carried by said shaft and rotatable therewith about its axis to positions to actuate a selected one of said auxiliary valves to permit the fluid in its associated pressure port to return to the exhaust port.

References Cited in the file of this patent

UNITED STATES PATENTS

| | | |
|---|---|---|
| 1,968,422 | Proctor et al. | July 31, 1934 |
| 2,185,325 | Barrett | Jan. 2, 1940 |
| 2,189,094 | Weaver | Feb. 6, 1940 |
| 2,221,462 | Trambly | Nov. 12, 1940 |
| 2,331,790 | Nichols | Oct. 12, 1943 |
| 2,343,689 | Mercier | Mar. 7, 1944 |
| 2,410,918 | Acton | Nov. 12, 1946 |
| 2,419,908 | Mott | Apr. 29, 1947 |
| 2,438,389 | Edge | Mar. 23, 1948 |
| 2,527,823 | Karlsson et al. | Oct. 31, 1950 |
| 2,577,351 | Mott | Dec. 4, 1951 |
| 2,609,207 | Van Sickle | Sept. 2, 1952 |